(12) United States Patent
Williams

(10) Patent No.: US 7,935,371 B2
(45) Date of Patent: May 3, 2011

(54) METHOD FOR PRODUCING NUCLEATION OF SOLID PHASE FROM A SUPERCOOLED LIQUID

(75) Inventor: Philip Rhodri Williams, Gower (GB)

(73) Assignee: UWS Ventures Limited, Swansea (GB)

( * ) Notice: Subject to any disclaimer, the term of this patent is extended or adjusted under 35 U.S.C. 154(b) by 1119 days.

(21) Appl. No.: 10/546,897

(22) PCT Filed: Feb. 27, 2004

(86) PCT No.: PCT/GB2004/000826
§ 371 (c)(1),
(2), (4) Date: Jul. 5, 2006

(87) PCT Pub. No.: WO2004/075650
PCT Pub. Date: Sep. 10, 2004

(65) Prior Publication Data
US 2007/0134393 A1 Jun. 14, 2007

(30) Foreign Application Priority Data
Feb. 28, 2003 (GB) .................................. 0304716.4

(51) Int. Cl.
*A23G 9/04* (2006.01)

(52) U.S. Cl. ................. 426/66; 426/238; 426/524; 62/1; 62/86; 62/121

(58) Field of Classification Search .................. 426/524, 426/515, 384–385, 66–68, 237, 238; 62/1, 62/86, 121
See application file for complete search history.

(56) References Cited

U.S. PATENT DOCUMENTS

| | | | | |
|---|---|---|---|---|
| 1,884,429 A | * | 10/1932 | Warner | 426/303 |
| 2,009,283 A | * | 7/1935 | Warner | 62/71 |
| 2,343,767 A | | 3/1944 | Getz | |
| 2,425,714 A | * | 8/1947 | Baer | 426/510 |
| 2,616,604 A | * | 11/1952 | Folsom | 53/432 |
| 2,813,350 A | * | 11/1957 | Berger | 34/290 |
| 3,150,497 A | * | 9/1964 | Beckmann | 62/64 |
| 3,218,725 A | * | 11/1965 | Lamb | 34/287 |
| 3,394,469 A | * | 7/1968 | Rembs et al. | 34/92 |
| 3,798,337 A | * | 3/1974 | Abalo | 426/279 |
| 4,404,807 A | | 9/1983 | Zemelman et al. | |
| 4,891,235 A | * | 1/1990 | Mizuguchi et al. | 426/281 |
| 5,444,986 A | * | 8/1995 | Hino | 62/66 |
| 2003/0194473 A1 * | | 10/2003 | Redding et al. | 426/238 |
| 2005/0008739 A1 * | | 1/2005 | Talukdar et al. | 426/238 |

FOREIGN PATENT DOCUMENTS
WO WO00/01246 A 1/2000

* cited by examiner

Primary Examiner — Drew E Becker
(74) Attorney, Agent, or Firm — Tumey L.L.P.

(57) ABSTRACT

A method of manufacturing a frozen or partially-frozen product which method includes: a) providing a liquid material in a substantially sealed vessel; b) subjecting liquid material to a negative pressure; and c) subjecting the liquid material, whilst under the negative pressure, to a temperature substantially less than 0° C.

26 Claims, 4 Drawing Sheets

METHOD FOR PRODUCING NUCLEATION OF SOLID PHASE FROM A SUPERCOOLED LIQUID

FIELD OF THE INVENTION

The present invention is concerned with a method for producing nucleation of solid phase from a supercooled liquid. In particular, the present invention is concerned with a partially frozen foamed product and a method of making such a product. The product may include ice-cream, frozen yoghurts, sorbets or the like.

BACKGROUND OF THE INVENTION

Ice-cream is a partly-frozen foam, incorporating fat globules, ice crystals and air bubbles. The conventional approach to the production of partially frozen water mixtures, such as ice-cream and ice-cream type products requires inter alia that the ice-cream mixture is simultaneously frozen and mechanically whipped, to produce ice crystals and air bubbles, respectively. This usually involves a 'barrel freezer', which is a scraped-surface, tubular heat exchanger in which the batch freezing process takes 10-15 minutes. There are rotating blades inside the barrel that keep the ice scraped off the freeze surface and there are usually internal vanes/fins to aid whipping and incorporation of air.

BRIEF SUMMARY OF SOME OF THE PREFERRED EMBODIMENTS

The present invention is also concerned with a method of producing an 'ice-slurry' (which is a mixture of fine ice crystals and water) for use in air-conditioning apparatus or the like. The widespread adoption and use of ice-slurry in cold energy devices is, at present, limited by undesirable freezing of the supercooled water during its transport.

Many recent theories which describe the role of cavitation in a process for making ice-slurries have shortcomings, mainly due to the fact that they invoke (and indeed require) the collapse of a spherical cavitation bubble. In such a situation it has been estimated that water near the bubble wall may experience sufficient pressure ($10^4$ bar, or more) to nucleate a crystal of a 'high pressure' form of ice (Inada T, Zhang X, Yabe A, Kozawa Y. International Journal of Heat and Mass Transfer, 44 (2001) 4523-4531). As such collapse-induced pressure may persist for only ca. 1 nanosecond, it has been necessary to assume in previous descriptions of the process that normal ice (i.e. hexagonal) subsequently grows on a 'high pressure' ice nucleus. This is at present unsubstantiated and unlikely to occur in practical engineering situations. Firstly it is a matter of great technical difficulty to even generate a spherical cavitation bubble, let alone maintain the requisite sphericity to produce the necessary large pressure amplitudes during collapse. The existence of such a 'high pressure' ice nucleus has not been verified in the production of solid from supercooled water by ultrasonically induced cavitation.

Despite great interest in supercritical fluid processing (Hauthal W. H. Chemosphere 43 (2001) 123), little attention has been paid to exploiting the properties of metastable liquids below the critical point, within the region between the spinodal and the 'coexistence curve', where liquid and vapour coexist (see FIG. 1 and FIG. 2). The spinodal line represents the locus of the minima where $(\partial p/\partial V)_T=0$ and the isothermal compressibility, $\kappa_T = V^{-1}(\partial V/\partial P)_T$ diverges. At positive pressures it defines a limit of superheating, but at negative pressures it represents a liquid's ultimate tensile strength. A liquid under negative pressure (or 'tension') is metastable (being superheated with respect to liquid vapour) but that in this state it may be supercooled (Hayward A. T. J. Am. Sci. 59 (1971) 434; Henderson, S. J., Speedy. R. J. J. Phys. E: Sci. Instrum. 13 (1980) 778; Hunt J. D. and Jackson K. A. J. Appl. Phys. 37 (1966) 254) and is then doubly metastable, being simultaneously superheated and supercooled (Debenedetti P. G. 1996 Metastable Liquids: Concepts and Principles. Princeton University Press). The possibility of producing materials with novel structures and/or properties from doubly metastable liquids has not previously been considered.

Water lends itself to this method as it is readily supercooled to around −25° C. (and lower, with more difficulty) while its ability to form networks of hydrogen bonds increases the number of solid forms possible, including stable (and metastable) crystal and amorphous structures.

The generation of negative pressures (to −60 bar) in supercooled water (at −18° C.) was reported by Henderson and Speedy (Henderson, S. J., Speedy. R. J. J. Phys. E: Sci. Instrum. 13 (1980) 778). No ice was detected, nor was cavitation evident. However, they concluded that lower temperatures were not reached due only to the limitation of their cooling apparatus. The results of this rare excursion into the doubly metastable regime differ from those of Hayward (Hayward A. T. J. Am. Sci. 59 (1971) 434), in whose work water was held at −0.2 bar and −5° C.: on further cooling the water froze and the intervening water boiled at the same instant, but in deaerated water ice appeared without disrupting the negative pressure. This latter observation is significant as it suggests that ice crystals may both form and grow under sustained negative pressure—a very different environment from that in which nucleation is accompanied by the relief of tension, and ice subsequently develops under 'normal' supercooled conditions (i.e. at atmospheric pressure) to form natural hexagonal ice (Ih). Ice phases with different crystalline structures exist at lower temperatures and positive pressures (>2 kbar) but the phase diagram (see figure) is sparsely populated with data at negative pressures. In the 'full' locus of the Ice I-liquid phase transition line for water, the negative pressure portion is largely a matter of conjecture, but estimates of the locus of stability for water extend to −2 kbar (Speedy, R J. J. Phys. Chem. 86 (1982) 982). No structural information exists for ice formed from doubly metastable water, or any other doubly metastable liquid. Raman spectroscopy has been used to study the melting of ice Ih under tension (Green J. L., Lacey, A. R, Sceats, M. G., Henderson, S. J. and Speedy, R. J. J. Phys. Chem. 91 (1987) 1684), and observations of the melting of metastable ice I under tension have been reported (Roedder, E. Science 155 (1967) 1413), but in neither case was the ice formed from doubly metastable water. To date, the formation of superheated ice from freezing superheated water has only been claimed for small positive pressures (Schubert, G. and Lingenfelter, R. E. Science 168 (1970) 469) and although a crystalline ice which is heavier than water has been reported in water cooled under vacuum in a cryophorous, its existence has not been verified (Franks, F. (Ed.) Water. A Comprehensive Treatise. Vol. 1. 1972 Plenum Press, New York).

Note that it is generally assumed that ice itself is stable when the (P, T) melting line (see FIG. 1) is extended to the liquid's conjectured stability limit but there may be conditions where ice becomes mechanically unstable (Roedder, E. Science 155 (1967) 1413). A possible consequence of the freezing line terminating above the spinodal would be that, at lower negative pressures, water would be unable to freeze (to Ice I). The 'stability limit conjecture' (Green J. L., Lacey, A.

R, Sceats, M. G., Henderson, S. J. and Speedy, R. J. J. Phys. Chem. 91 (1987) 1684) which argues against this situation arising has yet to be substantiated by sufficient penetration into the doubly metastable region.

Ice formation in water is important in the production of foods, such as ice-cream. A celebrated phenomenon recorded during the freezing of ice-cream mixtures is that hot water may appear to freeze faster than the same amount of cold water, under otherwise identical conditions (Auerbach, D. S Am. J. Phys. 63 (1995) 882). This has been explained in terms of supercooling, and the icosahedral clustering which mitigates against the necessary arrangement of water molecules to form hexagonal ice crystals.

Initially-cold water will have the maximum (equilibrium) concentration of icosahedral clustering, but this is far less extensive in initially-hot water and is not fully reattained if cooling is sufficiently rapid. It follows that the degree of supercooling in initially-cold water is 1s greater than in initially-hot water and the latter appears to freeze at a higher temperature. In fact, most of the apparently frozen ice is merely trapped liquid water but in the production of systems such as ice-cream, a completely frozen product is undesirable. If the concentration of icosahedral clustering could be reduced by tension-induced superheat, rather than thermally, it would be possible to have a significant impact on both the energy costs associated with, and the speed of production of, partially frozen systems. And in particular partially frozen edible products.

The term supercooling or supercooled is the reduction of the temperature of any liquid below the melting point of that substance's solid phase.

It is therefore an aim of the present invention to alleviate at least some of the disadvantages identified above.

It is a further aim of the present invention to provide a method of manufacturing a frozen product.

It is a further aim of the present invention to provide a method of manufacturing a partially-frozen ice-slurry for use as a working fluid in 'cold-energy' storage and transport devices for refrigeration and air-conditioning applications.

It is a further aim of the present invention to provide a method of manufacturing a partially frozen ice-slurry mixture suitable for use as artificial snow.

It is still yet a further aim of the present invention to provide an improved frozen product, such as ice-cream or the like, which may consist of a partially-frozen mixture of ice-water-air.

It is still yet a further aim of the present invention to provide an improved frozen or partially-frozen product in which air bubbles of microscopic dimensions (micron-sized or sub-micron sized) are immobilised within a partially-frozen water-ice matrix.

Therefore according to a first aspect of the present invention, there is provided a method of manufacturing a frozen or partially-frozen product which method includes:
 a) providing a liquid material in a substantially sealed vessel;
 b) subjecting the liquid material to a negative pressure; and
 c) subjecting the liquid material, whilst under the negative pressure, to a temperature substantially less than 0° C.

It is particularly preferred that the liquid is water.

According to a first aspect of the present invention, the negative pressure is typically achieved by applying heat to the vessel thereby permitting the liquid to expand until it substantially fills the vessel, prior to step c), such that, when the vessel is cooled in step c), the adhesion of the liquid to the internal walls of the vessel prevent the liquid from contracting at a greater rate than the vessel's internal volume and progressively increasing negative pressure develops. The negative pressure so developed may be augmented, regulated, or diminished, by one or more moving pistons, each piston having a sealed face which forms a bounding surface of the sealed vessel.

Preferably, the pressure is less than +100 bar during the heating phase.

The invention therefore extends to a method of manufacturing a frozen or partially frozen product whereby a mixture is substantially simultaneously superheated and supercooled. The liquid material is typically subjected to a temperature within the range +40° C. to −20° C.

According to a second aspect of the present invention, the negative pressure may be produced by the reflection of a pulse of positive pressure within the sealed vessel.

Preferably, the vessel has at least one first bounding surface including a flexible membrane which is in contact with the fluid, such that the pulse of negative pressure is produced by reflection of a positive pressure pulse at the the flexible membrane.

It is envisaged that the positive pressure pulse may be produced by the impact of a substantially solid object (such as a plunger, piston or projectile or the like) at a second bounding surface of the vessel. The sealed vessel may be attached to an external mechanism (involving a spring-loaded piston, hammer, actuator, plunger, projectile or the like) for the purpose of developing a pressure pulse within the liquid; the sealed vessel may subsequently be detached from this external mechanism following the production of the frozen or partially-frozen product. It is therefore preferred that the external mechanism is removably connected to the vessel.

Alternatively, the positive pressure pulse (which is subsequently converted to negative pressure by reflection from a flexible membrane) may be produced by the sudden release of pressure from a reservoir in contact with the fluid within the sealed vessel. The release of pressure may be achieved by the mechanical rupture of a membrane, or by the penetration of the pressure reservoir by a suitable external system such as a needle-like plunger, piston or projectile.

According to a third embodiment, a negative pressure pulse (in the form of a rarefaction wave) may be produced by the sudden release of a vacuum from a reservoir forming one bounding surface in contact with the liquid within the sealed vessel. The release of vacuum pressure may be achieved by the mechanical rupture of a membrane, or by the penetration of the reservoir by a suitable external system such as a needle-like plunger. The sealed vessel may be attached to an external mechanism (involving a spring-loaded piston, hammer, actuator, plunger or needle) for the purpose of releasing vacuum and the sealed vessel may subsequently be detached from this external mechanism following the production of the frozen or partially-frozen product. It is therefore preferred that the external mechanism is removably connected to the vessel.

Preferably, the fluid is maintained under a sufficient level of positive hydrostatic pressurisation within the sealed vessel, prior to step b), so as to prevent premature nucleation of solid or vapour phases.

Advantageously, supercooling the liquid material while it is superheated with respect to its vapour by negative pressure, and to exploit the fact that the inevitable tensile failure of the liquid results in the spontaneous production of air bubbles and ice crystals simultaneously, throughout the mixture. Furthermore, due to the anticipated effect of negative pressure on the equilibrium icosahedral clustering concentration of water molecules, it may be expected that this process will achieve the required partly-frozen state significantly faster than if the mixture were cooled under otherwise identical conditions, at ambient pressures.

The method of the present invention results in faster freezing with no whipping in a simple apparatus with no moving parts (merely a sealed vessel) exploits the curious (and little known) ability of liquids to be doubly metastable i.e. to be simultaneously superheated and supercooled.

Therefore, according to a first embodiment of the present invention, the method is suitable for use in the manufacture of an edible partially frozen water mixture, such as ice cream and ice-cream type products. According to this embodiment, the liquid preferably includes water-sugar mixtures and milk-sugar mixtures however, it is envisaged that other ingredients, for example flavourings, texture modifiers, stabilisers and fats may be added to the liquid prior to step (a).

Typically, the liquid is a mixture suitable for manufacture of frozen edible products, such as ice-creams, sorbet, sherbets, frozen desserts or the like. It is also envisaged that the liquid may include other ingredients such as texture modifiers, stabilisers, fats, beneficial micro-organisms, sugars, flavourings or colloidal solid entities such as dispersed solid particles or liquid droplets or macromolecular clusters.

The foamed frozen product is typically an edible product.

Suitable foamed products include ice-creams (which are particularly preferred), sorbets, sherbets, frozen yoghurts or the like.

According to a second embodiment of the present invention, the method is suitable for use in the manufacture of a partially frozen product (such as an ice slurry) suitable for use in air conditioning apparatus, 'cold energy' storage and transportation devices. It is particularly preferred that the liquid according to this embodiment of the present invention includes water.

It is also envisaged that the partially frozen product manufactured according to the present invention, is also suitable for use as artificial snow. Accordingly, there is provided a method of manufacturing an ice slurry or artificial snow, which method includes:

a) providing a liquid material in a substantially sealed vessel;
b) subjecting the liquid material to a negative pressure; and
c) subjecting the material, whilst under the negative pressure, to a temperature substantially less than 0° C.

The method of the present invention is particularly advantageous in the manufacture of such foamed frozen products, as only cooling of the liquid is required (there is no whipping of the product, at any stage). The method has the benefit of reduced energy costs. The partially frozen state is achieved faster than by traditional methods, which also has the added benefit of reduced energy costs and production time. Furthermore, the ice-crystals and the air bubbles are produced everywhere in the resultant foamed frozen product, simultaneously. This is particularly advantageous as the separate stage of whipping air into a partially frozen system is no longer required.

Moreover, it is a further advantage of the present invention that at the instant of tensile failure of the liquid material and the nucleation of growing bubbles, it exploits the production of the hydrodynamic pressure field produced about each individual bubble and the effect of this pressure field on the surrounding liquid's ice nucleation temperature. Consequently each growing bubble becomes immobilised in a shell of ice and is thereby prevented from growing to a large size. In this way the need to employ whipping to reduce bubble size, as in conventional production methods, is not necessary in the present invention.

The method according to the present invention also provides the advantage that the apparatus utilised for the method is much simpler (and therefore much more cost effective). The apparatus used according to the present invention may therefore simply be a sealed vessel, which requires no moving parts. As a result, the vessel and therefore the apparatus has a relatively low cost, is easy to clean and variation of the size of the vessel does not result in significant scale up charges. The vessel may be augmented by sealed moveable pistons whose faces form the ends of the vessel.

Advantageously, due to the anticipated effect of negative pressure on microbiological entities, it may be expected that subjecting the liquid to a negative pressure has the further advantage of destroying microbiological entities (such as *E. Coli* or the like) that may be present in the liquid. This is particularly advantageous when the method according to the present invention is used to manufacture edible products, as an additional sterilisation step may no longer be required. Advantageously, it may be expected that the method destroys substantially all microbiological entities that may be present in the liquid.

Advantageously, due to the anticipated effect of negative pressure on ice-water structure, it is envisaged that the products manufactured according to the present invention do not have the normal ice crystal structure (hexagonal Ih).

Therefore, according to a further aspect of the present invention, there is provided a partially frozen product, such as ice-cream or the like, having a structure comprised of dispersed, microscopic (micron-sized or submicron-sized) air bubbles surrounded by, and immobilised in, shells of amorphous ice.

It is also envisaged that there may be a delay of, hours, days, weeks or even months after step b) and prior to step c).

Therefore according to yet a further aspect of the present invention, there is provided a vessel containing a liquid, the liquid having been superheated in the vessel so as to create a negative pressure in a supercooled liquid within the vessel.

The liquid is substantially as described herein before with reference to a first aspect of the present invention.

It is envisaged that the vessel, and therefore its contents, can be stored at ambient temperature prior to cooling the vessel to a temperature of less than 0° C. (such as less than about 4° C.). Advantageously, cooling the vessel (and therefore it's contents) provides a frozen product substantially as described herein before. Storing the vessel at ambient temperatures prior to freezing has a number of advantages, including reduced transportation costs (refrigerated transportation is not required thereby saving energy) and the retailer or consumer does not need to expend energy by freezing the vessel containing the liquid until they wish to consume it's contents (storage charges would therefore be much cheaper).

BRIEF DESCRIPTION OF THE DRAWINGS

The present invention will now be further described, by way of example only, with reference to the following Figures, wherein.

DETAILED DESCRIPTION OF THE PREFERRED EMBODIMENTS

Figure 1:
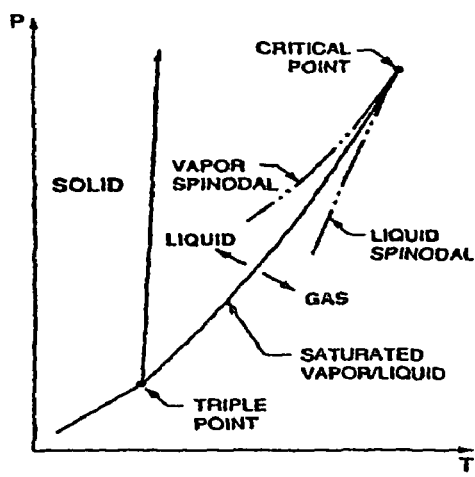
FIG. 1 represents a (Pressure, P, Temperature, T) definition diagram for the terms critical point, liquid spinodal and vapour spinodal.
Figure 2:
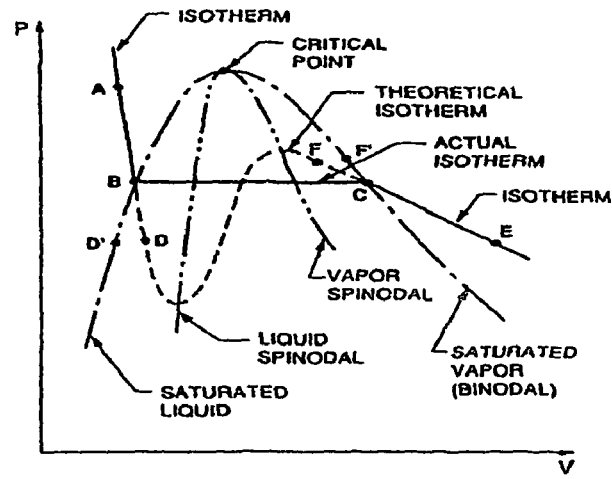
FIG. 2 represents a typical isotherm (P, V) for a van der Waals-like fluid.
Figure 3:
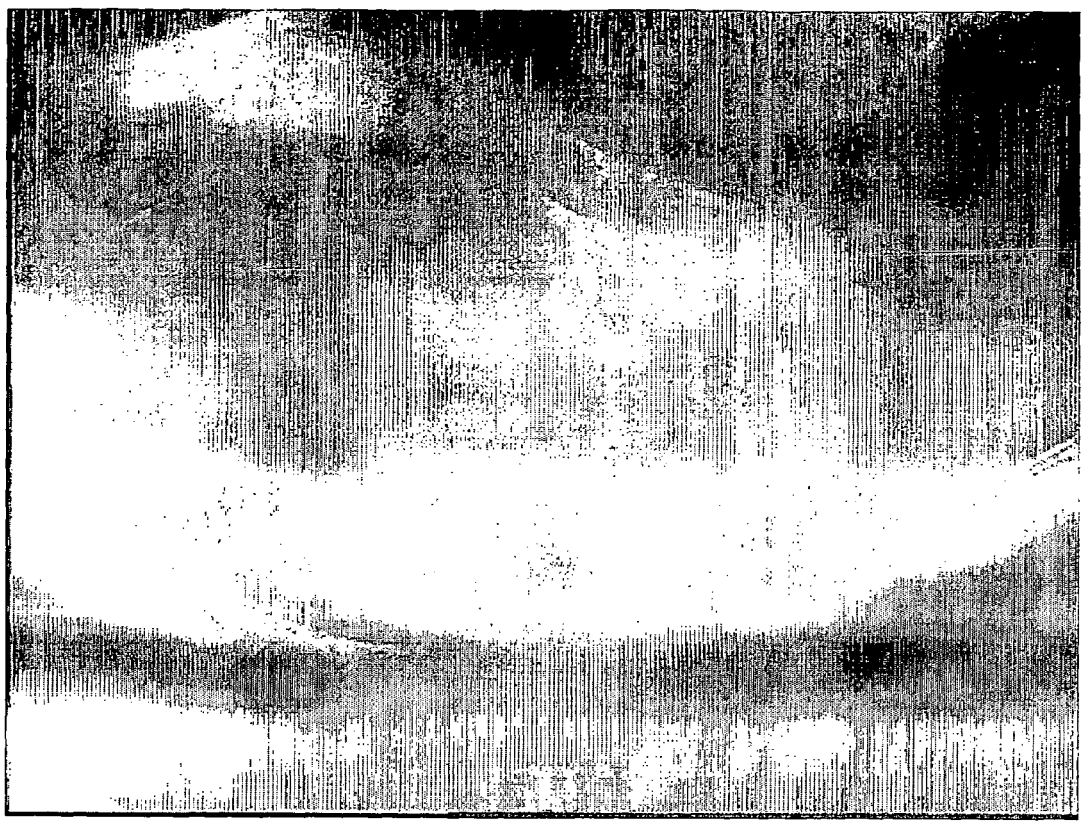
FIG. 3 represents an image taken from a sequence of high speed video microphotographs (at 40,000 pictures per second) of partially-frozen water-ice-air mixture formed from simultaneously supercooled and superheated sugar-water mixture.

Referring to FIG. 3 it can been seen that the sub-micron sized air bubbles trapped within and dispersed throughout the matrix of microscopic ice crystals are difficult to resolve by optical mean, a fact which emphasises and substantiates their microscopic dimensions.

Figure 4:
FIG. 4 represents a product formed by prior art (ie, in the absence of superheat by negative pressure) methods.
Figure 5:
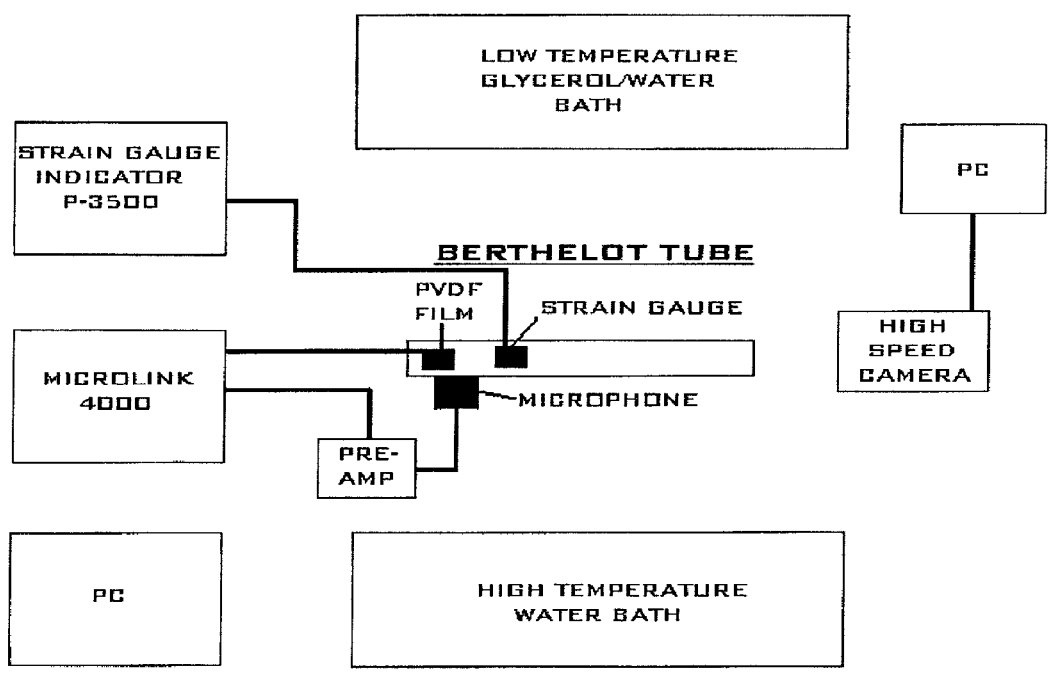
FIG. 5 represents a schematic drawing of apparatus which may be used according to the method of the present invention.

Referring to FIG. 4, it can be seen that the relatively much larger size of the ice crystals and air bubbles of products manufactured by prior art methods, makes them easily resolvable under the same recording conditions.

The apparatus for performing the method according to the present invention consists of a cylindrical glass tube, which is filled with a liquid and sealed. On heating the tube, the liquid expands until it completely fills the tube however, when subsequently cooled, the liquid's adhesion to the tube walls prevents the liquid from contracting at a greater rate than the tube's internal volume and a progressively increasing negative pressure develops (Trevena, D. H. 1987 *Cavitation and Tension in Liquids*, Adam Hilger, Bristol). The characteristic acoustic emission accompanying cavitation is recorded using thin (8 mm) PVDF films bonded to the tube's surface.

A thermoelectric (peltier) plate cooling system is used to control the cooling of the glass tube. This consists of an open top glass tank of dimension 6"×3"×1½" (L×W×H) with a base of ¼" thick aluminium. This base is screwed to an aluminium forced liquid circulation heat sink, which is supplied with cold water.

Cooling is achieved by two sets of peltier plates, which are sandwiched between the aluminium base and the heat sink. The peltier plates are of melcor manufacture and consist of a set of one UT8-12-40-F1-ST-T2 cascaded (stacked) onto one UT6-12-40-F1-ST-T2 and electrically connected in parallel. There are two sets of these cascades connected in series and powered by a 24V, 20A switch mode power supply. A close-fitting foam insulation insulates the glass tank and base from the ambient conditions (the insulation has removable sides to facilitate the use of a high-speed video system). With the insulation fitted the system is capable of cooling the liquid in the glass tank to −20° C. in approximately 20 minutes.

So as to avoid the liquid in the tank freezing, a solution of equal volumes of glycerol and water was used in the tank. This also prevents bubble formation and ensures the best optical quality for filming.

The tube consists of a borosilicate glass capillary of approximately 7 mm internal bore, 1.5 mm wall thickness, 100 mm length and is sealed at one end. The other end of the capillary is connected to a PTFE vacuum valve giving an overall length of 150 mm. A Kistler 603B dynamic pressure transducer is housed in the vacuum valve stem and a PVDF film of approximately 10 mm square is mounted on the outside of the capillary section and glued in place with a high strength adhesive which serves to securely mount the film on the glass and to waterproof the connections. In addition an amplified miniature microphone is mounted next to the glass surface.

The water is obtained by distillation from alkaline permanganate and subjected to Millipore filtration. In order to eliminate gas nuclei in hydrophobic crevices, the tube is etched in 5% HF which, in addition to cleaning the glass, dissolves flaws in its surface. Thus etched capillaries can withstand high pressures and, if necessary, the tube and vacuum-deaerated liquid may be pressurised (300 bar), using nitrogen to drive any remaining microbubble nuclei into solution.

The formation of the product is recorded by means of a high speed video microphotographic system consisting of a microscope objective lens, a telephoto lens, a set of magnifying extension tubes and a Kodak HS4540 high speed video camera. The telephoto lens is a Nikkor 105 mm/f1.8 manual focus model, the microscope lens being a Metallographic Apochromatic (×50) compound model with a numerical aperture of 0.55 (Mitotoyo Insts.). The microscope objective was made coincident with the optical axis of the telephoto using a custom-built mount convertor, the microscope objective being fixed at a distance of 2 mm from the front surface of the telephoto lens. The convertor was constructed in such a way that only light which passed through the microscope lens passed through the telephoto lens, the focus adjuster of the latter serving to vary the distance between the microscope lens and the sealed vessel containing liquid. The lenses were attached to the HS4540 camera by a 300 mm extension tube. Illumination was provided by reflected light using a vertical mirror.

The invention claimed is:

1. A method of manufacturing a frozen or partially-frozen product which method includes:
   a) providing a liquid material in a substantially sealed vessel;
   b) subjecting the liquid material to a negative pressure; and
   c) subjecting the liquid material, whilst under the negative pressure, to a temperature substantially less than 0° C.;
   wherein the negative pressure is achieved by heating the vessel thereby permitting the liquid to expand until it substantially fills the vessel, prior to step c), such that, when the vessel is cooled in step c), adhesion of the liquid to at least one internal surface of the vessel, thereby substantially preventing the liquid from contracting at a greater rate than the vessel's internal volume and progressively increasing negative pressure develops.

2. A method according to claim 1 wherein the liquid includes water.

3. A method according to claim 1, wherein the negative pressure is augmented, regulated, or diminished, by one or more moving pistons whose sealed faces form an end of this sealed vessel.

4. A method according to claim 1, wherein the liquid is subjected to a temperature in the range +40° C. to −20° C.

5. A method according to claim 1, wherein the pressure is less than +100 bar during heating phase.

6. A method according to claim 1, wherein the negative pressure is produced by the reflection of a pulse of positive pressure within the sealed vessel.

7. A method according to claim 6, wherein the vessel has at least one first bounding surface including a flexible membrane which is in contact with the fluid, such that a pulse of negative pressure is produced by reflection of a positive pressure pulse at the flexible membrane.

8. A method according to claim 6, wherein the positive pressure pulse is produced by the impact of a substantially solid object at a second bounding surface of the vessel.

9. A method according to claim 8, wherein the solid object is a plunger, a piston or projectile or the like.

10. A method according to claim 6 wherein the sealed vessel is removeably connected to an external mechanism arranged to produce a positive pressure pulse within the liquid.

11. A method according to claim 10, wherein the external mechanism is a spring-loaded piston, a hammer, an actuator, a plunger, or a projectile.

12. A method according to claim 6 wherein the positive pressure pulse is produced by a release of pressure from a reservoir in contact with the fluid within the sealed vessel.

13. A method according to claim 12, wherein the release of pressure is achieved by the mechanical rupture of a membrane, or penetration of the pressure reservoir by an external system.

14. A method according to claim 12, wherein the external system is a needle like plunger, piston or projectile.

15. A method according to claim 1, wherein the negative pressure, is produced as a pulse by the release of a vacuum from a reservoir forming one bounding surface in contact with the liquid within the sealed vessel.

16. A method according to claim 15, wherein the release of vacuum pressure is achieved by the mechanical rupture of a membrane, or by the penetration of the reservoir by an external system.

17. A method according to claim 16, wherein the external system comprises a needle like plunger.

18. A method according to claim 15, wherein the sealed vessel is removeably connected to an external mechanism which is arranged for release of a vacuum.

19. A method according to claim 1, wherein the fluid is maintained under a level of positive hydrostatic pressurisation within the vessel, prior to step b), so as to prevent premature nucleation of solid or vapour phases.

20. A method according to claim 1, wherein the pressure in step c) is from −250 bar to less than 0 bar.

21. A method according to claim 1, wherein the liquid includes water-sugar mixtures and/or milk-sugar mixtures.

22. A method according to claim 21, wherein the liquid further includes texture modifiers, stabilizers, fats, beneficial micro-organisms, sugars, flavourings, or colloisdal solid entities.

23. A method according to claim 22, wherein the colloisdal solid entities comprise dispersed solid particles or liquid droplets or macro molecular clusters.

24. A method according to claim 21, wherein the frozen or partially frozen product is an edible product.

25. A method according to claim 24, wherein the edible product comprises ice-cream, sorbets, sherberts, or frozen yoghourts.

26. A method according to claim 1 further comprising adapting the frozen or partially frozen product to be an edible foodstuff or a component of an air condition apparatus.

* * * * *